(12) United States Patent
Ta-Huynh et al.

(10) Patent No.: US 10,628,968 B1
(45) Date of Patent: Apr. 21, 2020

(54) SYSTEMS AND METHODS OF CALIBRATING A DEPTH-IR IMAGE OFFSET (71) Applicant: TOYOTA RESEARCH INSTITUTE, INC., Los Altos, CA (US)

(72) Inventors: Duy-Nguyen Ta-Huynh, Lexington, MA (US); Alexander Alspach, Somerville, MA (US); Naveen Suresh Kuppuswamy, Arlington, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 16/210,619

(22) Filed: Dec. 5, 2018

(51) Int. Cl.
*G06K 9/00* (2006.01)
*G06T 7/80* (2017.01)
*H04N 5/222* (2006.01)
*H04N 5/33* (2006.01)

(52) U.S. Cl.
CPC ............ *G06T 7/85* (2017.01); *G06K 9/00* (2013.01); *H04N 5/2226* (2013.01); *H04N 5/33* (2013.01)

(58) Field of Classification Search
CPC ........ H04N 5/2226; H04N 5/33; H04N 13/02; H04N 13/0203; G06K 9/00; G06T 7/85
USPC .............................. 382/103; 348/47, 187, 175
See application file for complete search history.

(56) References Cited

U.S. PATENT DOCUMENTS

| | | | | |
|---|---|---|---|---|
| 8,401,242 B2* | 3/2013 | Newcombe | ............. | A63F 13/06 382/107 |
| 8,831,285 B2* | 9/2014 | Kang | .................. | G06K 9/2018 348/661 |
| 8,866,889 B2* | 10/2014 | Masalkar | ................ | G06F 3/017 348/46 |
| 9,245,344 B2* | 1/2016 | Shim | ....................... | G06T 5/005 |
| 9,319,660 B2* | 4/2016 | Liou | .................... | H04N 13/239 |
| 9,582,889 B2* | 2/2017 | Shpunt | ................... | G01B 11/22 |
| 9,928,420 B2* | 3/2018 | Kirk | ................... | G01B 11/2513 |
| 10,085,011 B2* | 9/2018 | Lin | ...................... | H04N 13/106 |
| 2016/0189358 A1 | 6/2016 | Boufarguine | | |

FOREIGN PATENT DOCUMENTS

| | | |
|---|---|---|
| CN | 104616284 B | 8/2017 |
| KR | 101379787 B1 | 3/2014 |
| KR | 101781515 B1 | 9/2017 |

OTHER PUBLICATIONS

Tang, Shengjun, et al., "Enhanced RGB-D Mapping Method for Detailed 3D Indoor and Outdoor Modeling," MDPI, Sep. 27, 2016, pp. 1-22, Sensors 2016, 16, 1589.

* cited by examiner

*Primary Examiner* — Trang U Tran
(74) *Attorney, Agent, or Firm* — Seyfarth Shaw LLP (57) ABSTRACT

A system and method for determining an IR image offset and calibrating a depth sensing camera to account for the offset is provided. An RGB-D camera may image a checkerboard pattern at a known distance and location. The checkerboard pattern may be provided on a planar device, such as a board. A three-dimensional primitive shape may be placed at in a known location in relation to the checkerboard. Depth data may be obtained from the checkerboard with the primitive shape. As the system knows the actual depth of the primitive shape, a depth offset may be calculated from the returned depth information from the RGB-D camera. The system may determine the offset between the depth information and the color image. The offset may be taken into account to produce more accurate RGB-D images.

16 Claims, 4 Drawing Sheets

FIG. 7

SYSTEMS AND METHODS OF CALIBRATING A DEPTH-IR IMAGE OFFSET

FIELD OF TECHNOLOGY

The present disclosure relates to calibrating structured light depth cameras, more particularly to determining an offset between depths images and the corresponding Infrared images.

BACKGROUND

Three-dimensional cameras, such as the Kinect by Microsoft® or the Astra by Orbbec can provide three-dimensional images by analyzing a structured active pattern projected from a projector to the scene and captured by image sensors. The ability to obtain and process three dimensional images can be used in several applications including video games, automated systems, and robotics. As image capturing and computing technology has improved, so has the ability to implement sophisticated machine vision systems designed to operate in real-world environments executing complex and operations with increased accuracy.

The multiple imaging components of a three-dimensional camera allow the camera to simulate binocular vision and capture images that may be processed into three dimensional images with depth. Traditional structured light depth cameras have an inherent offset error between the captured IR image and the depth information produced by the camera. Different cameras types have different offsets. The differing offsets may be a result a correlation window size. These offset errors may produce inaccurate images and data and should be minimized or eliminated to ensure the accuracy of the vision system and any operations reliant on three-dimensional imaging.

SUMMARY

Aspects of the present disclosure include a system and method for determining an IR image offset and calibrating a depth sensing camera to account for the offset. According to aspects of the disclosure, an RGB-D camera may image a checkerboard pattern at a known distance and location. The checkerboard pattern may be provided on a planar device, such as a board. A three-dimensional primitive shape, such as a semi-sphere or a cylinder, may be placed at a precise, known location on the checkerboard or in a known location in relation to the checkerboard. Depth data is obtained from the checkerboard with the primitive shape. As the system knows the actual depth of the primitive shape, a depth offset may be calculated from the returned depth information from the RGB-D camera. Thus, the system may determine the offset between the depth information and the color image. This offset may be taken into account to produce more accurate RGB-D images.

According to one aspect of the disclosure, a method of calibrating a depth-IR image offset is presented. The method may include calibrating a first set of parameters of the IR sensor, and calibrating a second set of parameters with respect to a reference pattern. At least one depth image may be obtained by the IR sensor of a parametric object disposed in a known fixed location with respect to the reference pattern. A depth-IR image offset between the depth image of the parametric object and the known fixed location of the parametric object is determined.

According to another aspect of the disclosure, a calibration assembly is provided. The calibration assembly may include a reference pattern disposed on a board and configured to calibrate the extrinsic parameters of an IR camera. A parametric object may be disposed in a known location with respect to the reference pattern. The parametric object may be configured to provide depth information when imaged by the IR camera. A processor may be configured to determine a depth-IR image offset between the depth information of the imaged parametric object and the known location.

According to another aspect of the present disclosure a method of calibrating a depth-IR image offset is provided in which a set of intrinsic parameters of the IR sensor is calibrated. A set of extrinsic parameters of the IR sensor with respect to a fix-mounted reference pattern is also calibrated. The IR sensor may obtain at least one depth image of a parametric object having known parameters. The parametric object may be disposed in a fixed location on an opposing face of the fix-mounted reference pattern. A depth-IR image offset may be determined between the depth image of the parametric object and the known fixed location of the parametric object.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

Aspects of devices, systems, and methods are illustrated in the figures of the accompanying drawings which are meant to be exemplary and non-limiting, in which like references are intended to refer to like or corresponding parts, and in which.

DETAILED DESCRIPTION

The present disclosure generally provides a system and method for calibrating a Depth-IR image offset of a structured light depth camera, particularly for use with a robot or machine vision. Aspects of the present disclosure provide for a calibration assembly that may include a reference pattern on a surface and a parametric object disposed in reference to the reference pattern. The calibration assembly may be used to calibrate a three-dimensional ("3D") structured light depth camera by determining the offset between the Infrared ("IR") images obtained and the depth information produced by the camera, or an associated processor. The offset may be determined by imaging the reference pattern of the calibration assembly, imaging the parametric object and computing the Depth-IR image offset from the captured depth measurements of the 3D object's surfaces.

Figure 1:
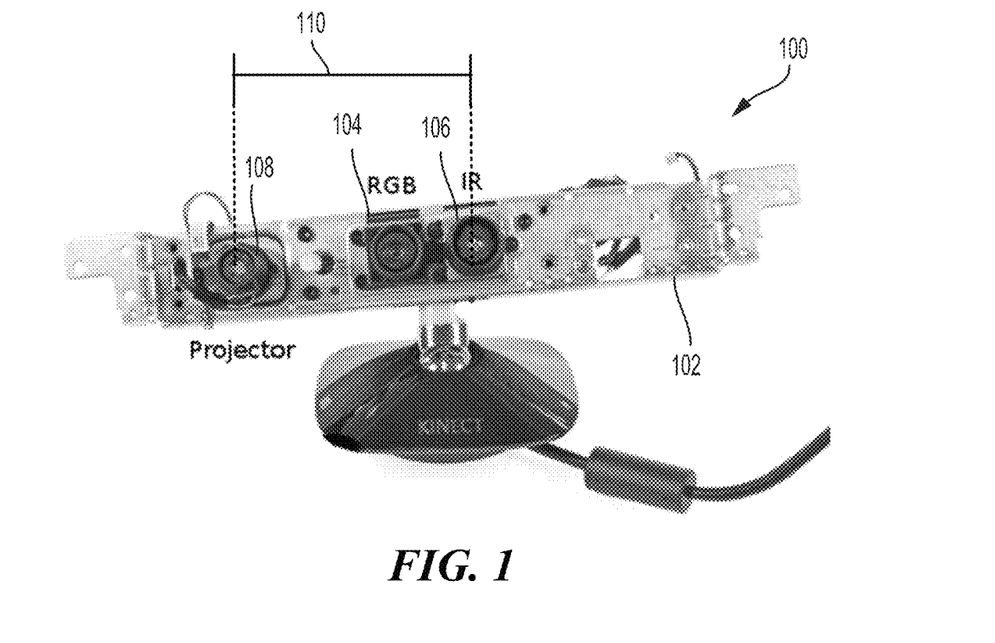
FIG. 1 depicts a three-dimensional structured light depth camera according to an aspect of the disclosure.

Traditional structured light depth cameras, such as an RGB-D camera, include an RGB imaging component, an Infrared ("IR") imaging components and an IR projector. FIG. 1 depicts a three-dimensional structured light depth camera 100 according to an aspect of the disclosure. A frame or body 102 may support or house an RGB imaging assembly 104, and IR imaging assembly 106, and an IR projector assembly 108. The RGB camera assembly 104 may include an RGB image sensor, one or more lenses, and other components, as are known in the art. The IR imaging assembly 106 may include an IR sensor, one or more lenses, and other components, as are known in the art. The IR projector 108 may project a defined pattern of IR light, such as a dot pattern. For example, the IR projector 108 may send out a fixed pattern of dots. The pattern may generated from a set of diffraction gratings, or the like, in the IR projector 108. The IR imaging assembly 106 may receive IR light reflected back from one or more surfaces or objects upon which the projected IR is incident. Depth information may then be calculated from the obtained IR image.

According to one aspect, the IR camera assembly 106 and the IR projector 108 may form a stereo pair with a baseline 110 separating the two assemblies. Depth information may be calculated by triangulation against the known pattern projected from the projector. The pattern may be memorized at a known depth, and for a new image, the depth may be calculated at each pixel. For each pixel in the IR image, a correlation window may be used to compare the local pattern at that pixel with the memorized pattern at that pixel and a number of neighboring pixels in a horizontal window. The best match gives a disparity offset from the known depth, in terms of pixels. Given the known depth of the memorized plane, and the disparity, an estimated depth for each pixel can be calculated by triangulation. There is, however, a fixed offset between the IR image and the depth image created from the IR image, referred to herein as the Depth-IR image offset. Aspects of the present disclosure provide a calibration assembly and a method for determining the Depth-IR image offset, for which the camera's processors may account to provide more accurate 3D vision.

Figure 2:
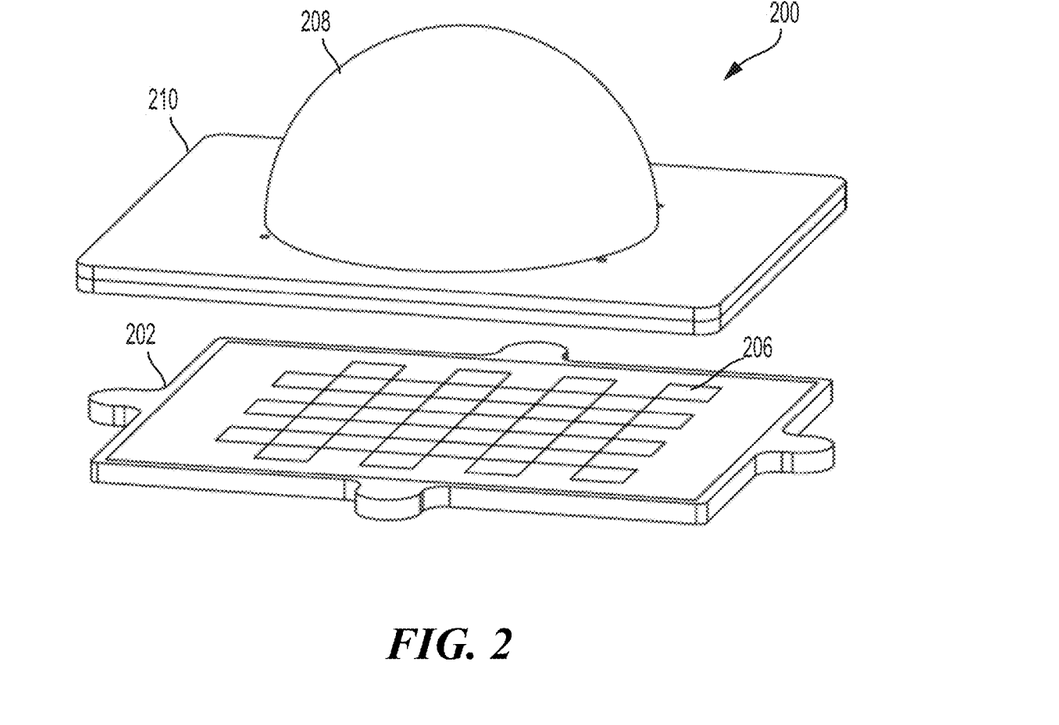
FIG. 2 depicts a perspective view of the components of a calibration assembly according to an aspect of the disclosure.

FIG. 2 illustrates a calibration assembly 200 according to an aspect of the present disclosure. A first board 202 may include or have disposed thereon a reference pattern 206. The reference pattern may be a checkerboard pattern or another pattern featuring well-defined regions of contrast. The well-defined regions may have alternating colors of high contrast, such as black and white squares that allow a camera to identify and delineate the different regions defined in the reference pattern 206.

A second board 210 may include a 3D parametric object 208 disposed on a second board 210. The parametric object 208 may provide a 3D geometric shape by which all given points on the surface of the object are known in relation to a center point or the second board 208. The parametric object 208 may be in the form of a half-sphere, sphere, cylinder or the like. The geometric properties of the parametric object 208, such as those of a sphere of half-sphere, are such every point on the surface of the parametric object 208 is known in relation to a reference location. For example, the reference pattern 206 may be at a known location with respect to a camera, and provide a reference location upon which the parametric object 208 may be placed. Because the reference pattern 206 is at a known location and the parametric object 208 is in a known location with respect to the reference pattern 206, every point on the surface of the parametric object 208 may be calculated.

Figure 3:
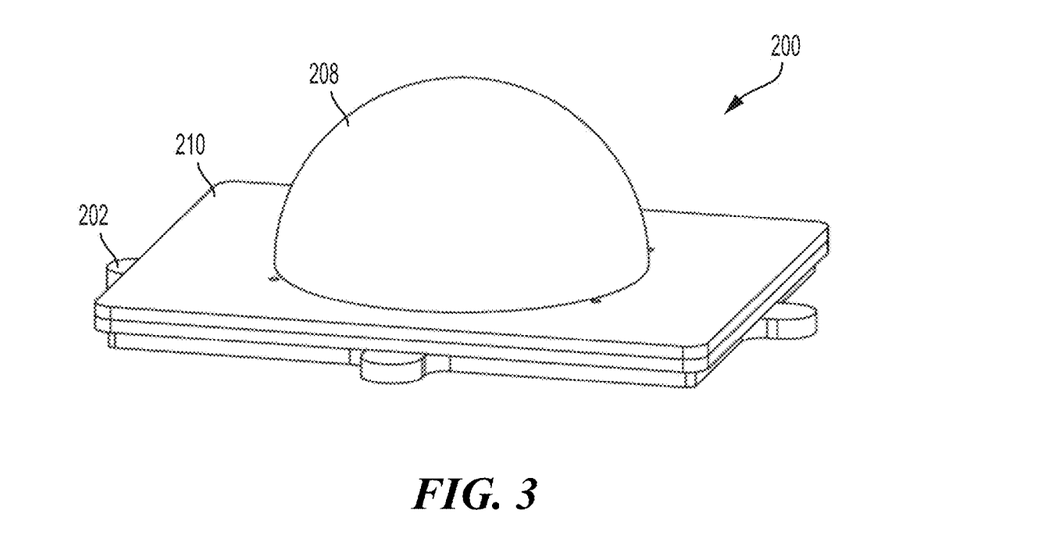
FIG. 3 depicts a perspective view of a calibration assembly according to an aspect of the disclosure.

FIG. 3 depicts the calibration assembly 200 with the second board 210 placed atop the first board 202. As described below, in a calibration process, the IR camera may obtain an image of the reference pattern 206 at a known location with respect to the camera and process the image for depth information. The IR camera may also obtain an image of the parametric object 208 placed atop the reference pattern 206 and process the image for depth information. The depth information from the IR image of the parametric object 208 may be compared to the known location information in order to calculate an offset between the IR images and the actual depth of the parametric object 208.

While aspects of the calibration assembly 200 provide for the placement of the parametric object 208 atop of the reference pattern 206 to establish a known location of the parametric object 208, with respect to the camera, the parametric object 208 may be placed in alternative locations. The parametric object 208 may be placed anywhere in relation to the reference pattern 206 so long as the locational relationship between the two is known. For example, the parametric object 208 may be placed adjacent to the reference pattern so long as the distances between the parametric object 208 and the reference patterns 206 is known.

Figure 4:
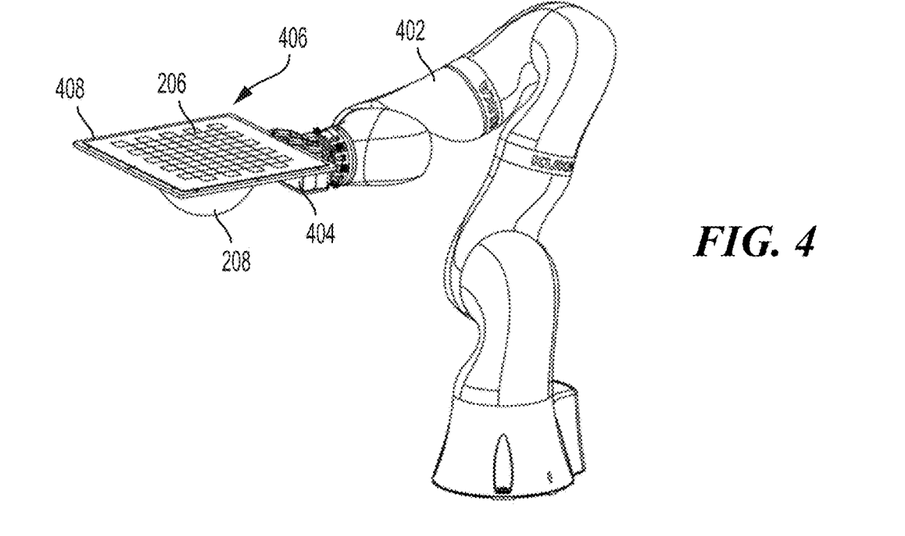
FIG. 4 depicts a robotic device holding a calibration assembly according to an aspect of the disclosure.
Figure 5:
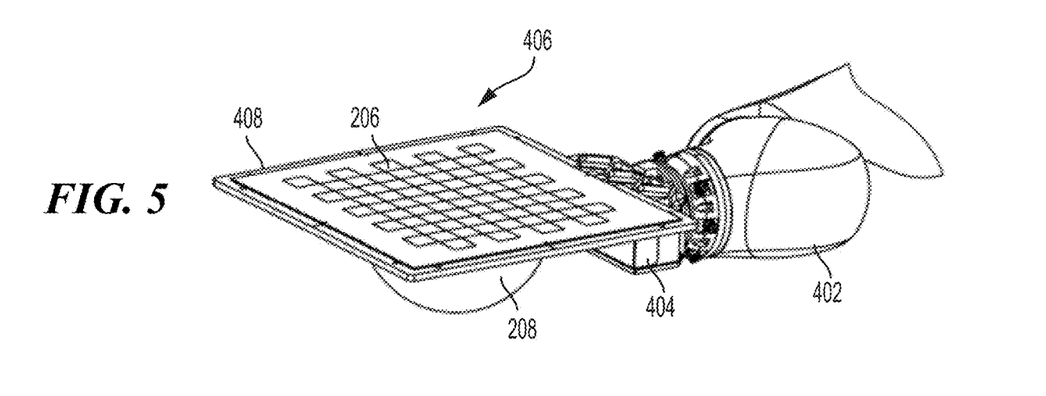
FIG. 5 is an enlarged view of a robotic device holding a calibration assembly in a first orientation according to an aspect of the disclosure.
Figure 6:
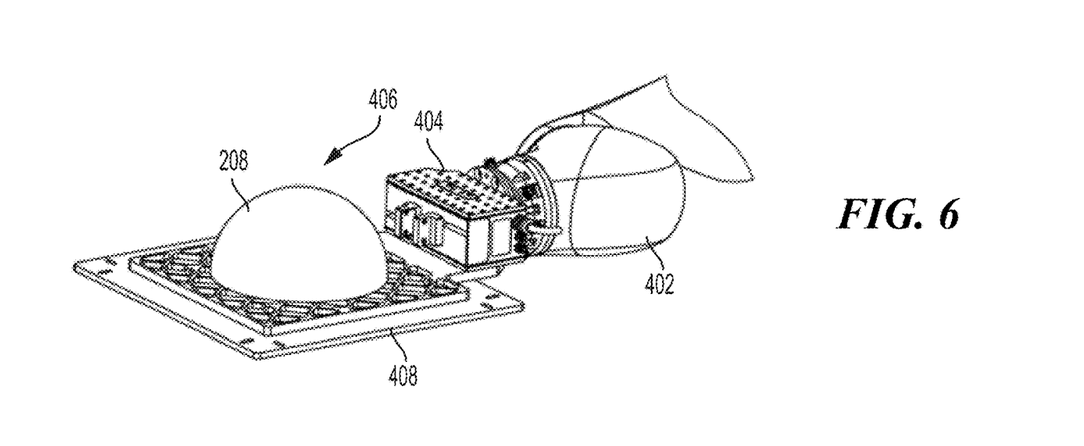
FIG. 6 is an enlarged view of a robotic device holding a calibration assembly in a second orientation according to an aspect of the disclosure.

FIGS. 4-6 depict a robotic arm 402 in various poses with a calibration assembly 406. As detailed above, in robotic and machine vision systems, it is vital to know the precise location of portions of the robot, such as end-effectors, joints, or the like, in relation to a camera being used to monitor and control the robot. For example, a robot arm 402 having an end-effector 404 configured to grasp an object may rely on a 3D camera to direct the robot arm 402 and end-effector 404 to the location of the object. The calibration assembly 406 may be a unified assembly in which the reference pattern 206 and the parametric object 208 are components of a single body. Such a configuration allows for a more automated calibration process that may eliminate time consuming and tedious substitutions of assembly components.

In order to establish a locational relationship between a camera and the robot arm 402, and particularly the end-effector 404, a calibration assembly 406 may be affixed to the end-effector 404 and imaged by the 3D camera. FIG. 4 depicts the robot arm 402 in a pose with the calibration assembly 406 affixed to the end-effector 404. According to an aspect of the invention, the calibration assembly 406 may include a single board 408 with a first surface and a second surface. The first surface may include the reference pattern 206, such as a black and white checkerboard. The second surface of the board 408 may include the parametric object 208.

FIG. 5 depicts an enlarged view of the calibration assembly 406 affixed to the end-effector 404 of the robot arm 402. In such a pose, a 3D camera (not shown) may image the reference pattern 206 of the calibration assembly 406 to establish a reference location of reference pattern. Because the position of the calibration assembly 406 is known in relation to the end-effector 404, the location of the end-effector 404 in relation to the camera may also be known. Once the reference pattern is imaged and the reference locations are established, the parametric object 208 may be imaged to determine the Depth-IR image offset.

FIG. 6 depicts the robot arm 402 in a pose by which the parametric object 208 is positioned to be imaged by the 3D camera. According to one aspect, the end-effector 404 may rotate the calibration assembly 406 one-hundred eighty degrees, keeping the robot arm 402 in the same pose and the end-effector 404 in the same position. The 3D camera may obtain an IR image of the parametric object 208, which is in a known location with respect to the reference pattern 206 and the position of the end-effector 404.

Figure 7:
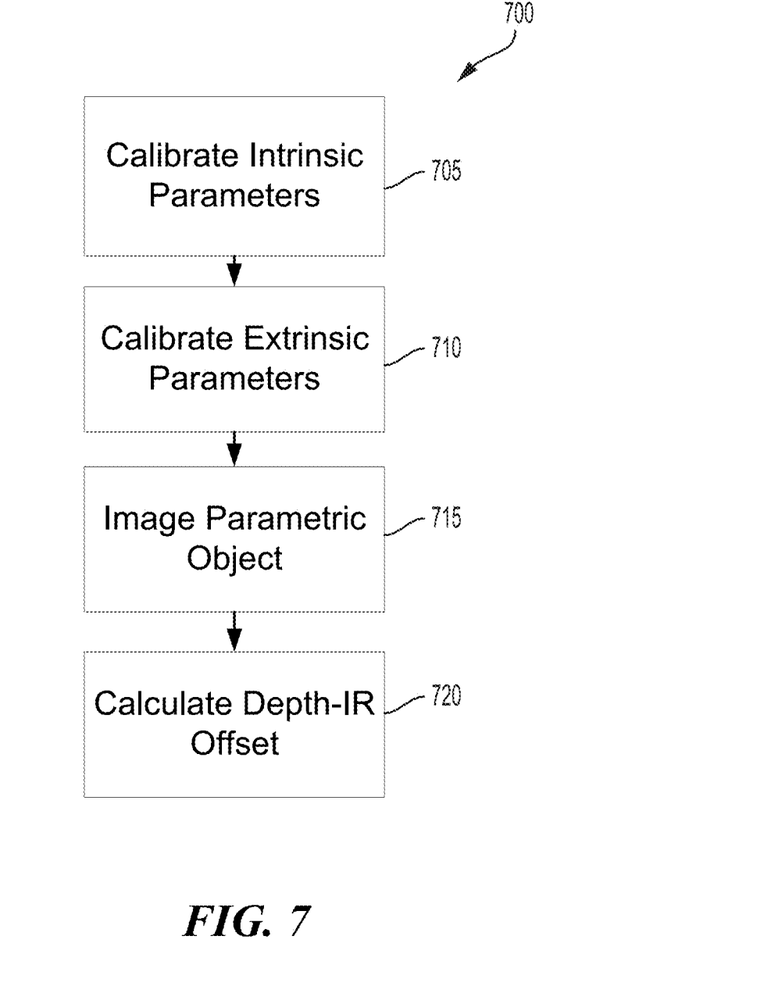
FIG. 7 is a flow chart depicting a method of calibrating a structured light depth camera according to an aspect of the disclosure.

According to an aspect of the disclosure the calibration assembly described herein may be employed to calibrate a 3D camera and in particular determine the Depth-IR image offset for the camera. FIG. 7 depicts a flow chart 700 depicting the steps of an exemplary calibration method according to an aspect of the present disclosure.

As shown in block 705 the intrinsic parameters of the IR camera are calibrated. The intrinsic parameters of the IR camera may include the focal length, the optical center of the camera, skew, and distortion parameters, for example. This calibration step may be done according to known methods in the art and are not described in greater detail herein. Once calibrated, the IR camera intrinsic parameters may be captured in a calibration matrix $K_{IR}$:

$$K_{IR} = \begin{bmatrix} f_x & s & c_x \\ 0 & f_y & c_y \\ 0 & 0 & 1 \end{bmatrix} \quad (1)$$

where $f_x$, $f_y$ are the camera focal lengths in the x and y dimensions, $c_x$, $c_y$ are the camera center image coordinates and s is a skew factor. It may be assumed that the camera is not significantly distorted and, therefore its distortion factor may be ignored for simplicity.

As shown in block 710, the extrinsic parameters of the IR camera may be calibrated with respect to a fix-mounted reference pattern. The extrinsic parameters may include the location of the IR camera within the 3D environment in which the camera and/or robot may be operating. As described above, the fix-mounted reference pattern may be a black and white checkerboard pattern with known measurements and a known fixed location. This calibration step may be done according to known methods in the art and are not described in greater detail herein. After the extrinsic parameters are calibrated, the pose $X_C^W$ of the camera frame C is obtained with respect to the world frame W, which may be assumed to be the reference pattern's origin. The pose $X_C^W$ is an element of the Special Euclidean group $\mathbb{SE}(3)$ and has the following matrix form:

$$X_C^W = \begin{bmatrix} R_C^W & t_C^W \\ 0 & 1 \end{bmatrix}$$

where $R_C^W \in \mathbb{SO}(3)$ is an 3×3 orthogonal rotation matrix and $t_C^W \in \mathbb{R}^3$ the 3D translation vector.

As shown in block 715, depth images of a parametric object may be obtained. According to one aspect, the parametric 3D object, such as a cylinder or sphere with known parameters may be placed in a known location with respect to the fix-mounted reference pattern in the scene, and several depth images of the parametric object may be obtained.

As shown in block 720, the unknown Depth-IR image offset may be calculated from the captured depth measurements that measure the parametric object's surfaces. The unknown Depth-IR image offset may be denoted $\Delta = (\Delta_x, \Delta_y) \in \mathbb{R}^2$. Given depth measurements $z = \{z_i\}_{i=0}^N$ of a set of N points in the parametric object surface, the method may obtain an optimal value of the offset $\Delta$ that maximizes the posterior probability $p(\Delta|z)$:

$$\Delta^* = \mathrm{argmax}_\Delta p(\Delta|z) = \mathrm{argmax}_\Delta p(z|\Delta) p(\Delta) \quad (2)$$

where the known Bayesian rule $p = p(z|\Delta)p(\Delta)/p(z)$ may be applied, dropping the constant term $p(z)$, to convert the posterior $p(\Delta|z)$ to a product of the likelihood $p(z|\Delta)$ and the prior $p(\Delta)$ of the offset. It may be assumed that the prior $p(\Delta)$ is a Gaussian $\mathcal{N}(\Delta; \Delta_{prior}, \Sigma_{prior})$ with mean $\Delta_{prior}$ and covariance $\Sigma_{prior}$.

As known in the art, it may also be assumed that the depth measurements $z_i$s are independent and identically distributed as Gaussian distributions with pixel-dependent standard deviation $\sigma_i$. Under such an assumption, the likelihood may be factored as follows:

$$p(z|\Delta) = \prod_i p(z_i|\Delta).$$

The likelihood model for each depth pixel measurement may be specified as $p(z_i|\Delta)$.

Let $F(P^W) = 0$ be the implicit function of our object's parametric surface, where $P^W$ is a point on the surface in the world coordinate frame, i.e., the reference pattern checkerboard. The function $F(\cap)$ may have different forms depending on the parametric object being used. For example, the implicitly function of a sphere according to one aspect may be specified as:

$$F(P^W) = \mathrm{dist}(P^W, O^W) - r;$$

where r and $O^W$ and are the known radius and center of the sphere in the world coordinate frame, and $\mathrm{dist}(P,O) = \sqrt{(P-O)^T(P-O)}$ the distance between two 3D points, $P, O \in \mathbb{R}^3$.

Using the implicit surface function, the likelihood model may be defined as follows:

$$p(z_i|\Delta) \triangleq k \exp(-\|F(P_i^W)\|_{\gamma_i}^2),$$

where $P^W$ is the 3D coordinate of the 3D point corresponding to the measurement $z_i$; $y_i$ is the standard deviation of the random variable $q_i \triangleq F(P_i^W) \triangleq H(z_i, \Delta)$, which is the function of $z_i$ and $\Delta$ because $P_i^W$ depends on them; and k is a constant factor. In general, $q_i$'s distribution is not a Gaussian unless $H(\cap, \Delta)$ is linear with respect to $z_i$. However, given the offset $\Delta$, the first-order Taylor expansion of $H(\cap, \Delta)$ may be used:

$$H(z_i, \Delta) \approx H(z_i, \Delta) + \frac{\partial H}{\partial z}(z - z_i).$$

as its linear approximation, and $q_i$ is approximately Gaussian distributed with standard deviation:

$$\gamma_i = \left|\frac{\partial H}{\partial z}\right| \sigma_i. \quad (3)$$

To obtain the formulation of $H(z_i, \Delta)$, $P^W$ may be described as a function of $z_i$ and $\Delta$. The depth and IR camera frames are substantially identical, therefore the structured light depth camera's extrinsic pose is the same as the IR camera's pose $X_C^W$. Hence, given the offset $\Delta$, the coordinate of the 3D point corresponding to pixel i in the world frame is $$P_i^W = R_C^W \times P_i^C + t_C^W, \\ = R_W^C \times \pi^{-1}(x_i, y_i, z_i, \Delta) + t_C^W, \quad (4)$$

where $(x_i, y_i)$ is the image coordinate of pixel i, $z_i$ is its depth value, and $P_i^C = \pi^{-1}(x_i, y_i, z_i, \Delta)$ is the function that back-projects pixel i to the corresponding 3D point $P_i^C$ in the camera coordinate frame at depth $z_i$. Using a standard pinhole camera model, the back-projection function $\pi^{-1}(x_i, y_i, z_i, \Delta)$ may have the following form:

$$\pi^{-1}(x_i, y_i, z_i, \Delta) = z_i K_{depth}^{-1}(\Delta) \begin{bmatrix} x_i \\ y_i \\ 1 \end{bmatrix}, \quad (5)$$

where $K_{depth}(\Delta)$ is the calibration matrix of the structured light depth camera, which is similar to the calibration matrix of the IR camera $K_{IR}$ described above, except for the unknown offset $\Delta$:

$$K_{depth}(\Delta) = \begin{bmatrix} f_x & s & c_x + \Delta_x \\ 0 & f_y & c_y + \Delta_y \\ 0 & 0 & 1 \end{bmatrix}.$$

Combining equations (4) and (5), yields the following formula for $P_i^W$:

$$P_i^W = z_i R_C^W K_{depth}^{-1}(\Delta) \begin{bmatrix} x_i \\ y_i \\ 1 \end{bmatrix} + t_C^W.$$

Hence the form of $H(z_i, \Delta) \triangleq F(P_i^W)$ is:

$$H(z_i, \Delta) = F\left( z_i R_C^W K_{depth}^{-1}(\Delta) \begin{bmatrix} x_i \\ y_i \\ 1 \end{bmatrix} + t_C^W \right).$$

Maximizing equation (2), above, is equivalent to minimizing its negative log:

$$\Delta^* = \arg\min_\Delta -\log(p(z|\Delta)p(\Delta)),$$

which is a nonlinear least-squares problem:

$$\Delta^* = \arg\min_\Delta \sum_i \|H(z_i, \Delta)\|_{\gamma_i}^2 + \|\Delta - \Delta_{prior}\|_{\Sigma_{prior}}^2,$$

that can be optimized using a standard nonlinear least-squares optimization method, such as Gauss-Newton or Levenberg-Marquardt. The partial derivative of $H(\cap, \cap)$ with respect to $z_i$, needed to compute eq. (3), and with respect to $\Delta$, which is needed for the nonlinear least-squares optimization methods, can be computed easily using standard calculus. In practice, the automatic differentiation method may be used to compute those values.

According to one aspect, a goal is to obtain an RGB-D image. Once the Depth-IR image offset is determined, the IR camera and all processing of images obtained by the IR camera may be corrected according to the found value. Correcting for the Depth-IR image offset may enhance accuracy and performance of the robot or machine vision system. The depth may then be registered onto the RGB color camera. This may be achieved by registering the depth to the IR image first, then transforming it to the RGB frame with the known extrinsic parameters (i.e., relative poses)) between the IR and RGB cameras.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of calibrating a depth-IR image offset comprising:
   calibrating a first set of parameters of the IR sensor;
   calibrating a second set of parameters with respect to a reference pattern;
   obtain at least one depth image by the IR sensor of a parametric object disposed in a known fixed location with respect to the reference pattern; and
   determine a depth-IR image offset between the depth image of the parametric object and the known fixed location of the parametric object, wherein the depth image is obtained by projecting an IR pattern from a projector and capturing a reflection of IR light by the IR sensor.

2. The method of claim 1 wherein the reference pattern is fix-mounted.

3. The method of claim 1 wherein the reference pattern includes a high-contrast checkerboard.

4. The method of claim 1 wherein the parametric object comprises a geometric object with known parameters.

5. The method of claim 1 wherein the parametric object is a half-sphere.

6. The method of claim 1 wherein the parametric object is a cylinder.

7. The method of claim 1 wherein the parametric object is a sphere.

8. The method of claim 1 wherein the first set of parameters comprise intrinsic parameters.

9. The method of claim 8 wherein the intrinsic parameters comprise a focal length and an optical center of the IR sensor.

10. The method of claim 1 wherein the second set of parameters comprise extrinsic parameters.

11. The method of claim 10 wherein the extrinsic parameters comprise the location of the IR sensor in an environment.

12. A calibration assembly comprising:
   a board having a first and second surface;
   a reference pattern disposed on the first surface of the board, the reference pattern configured to calibrate the extrinsic parameters of an IR camera;
   a parametric object disposed on the second surface of the board in a known location with respect to the reference pattern, the parametric object configured to provide depth information when imaged by the IR camera;
   an end-effector coupled to a robotic arm, the robotic arm configured to hold the board in a known first position whereby the reference pattern is exposed to the IR camera and hold the board in a known second position whereby the parametric object is exposed to the IR camera; and
   a processor configured to determine a depth-IR image offset between the depth information of the imaged parametric object and the known location.

13. The calibration assembly of claim 12 further comprising a first board having the reference pattern disposed thereon.

14. The calibration assembly of claim 13 further comprising a second board having the parametric object disposed thereon, the second board and the first board having substantially similar dimensions.

15. The calibration assembly of claim 14 wherein the extrinsic parameters are calibrated by imaging the reference pattern on the first board and the second board is placed on the first board for imaging the parametric object.

16. A method of calibrating a depth-IR image offset comprising:
   calibrating a set of intrinsic parameters of the IR sensor;
   calibrating a set of extrinsic parameters of the IR sensor with respect to a fix-mounted reference pattern;
   obtain at least one depth image by the IR sensor of a parametric object having known parameters, the parametric object disposed in a fixed location on an opposing face of the fix-mounted reference pattern; and
   determine a depth-IR image offset between the depth image of the parametric object and the known fixed location of the parametric object, wherein the depth image is obtained by projecting an IR pattern from a projector and capturing a reflection of IR light by the IR sensor.

* * * * *